May 18, 1943. J. B. BIASOTTI 2,319,437
SAW GRINDING MACHINE
Filed Nov. 25, 1940 2 Sheets-Sheet 1

INVENTOR,
John B. Biasotti
BY Booth & Booth
ATTORNEYS

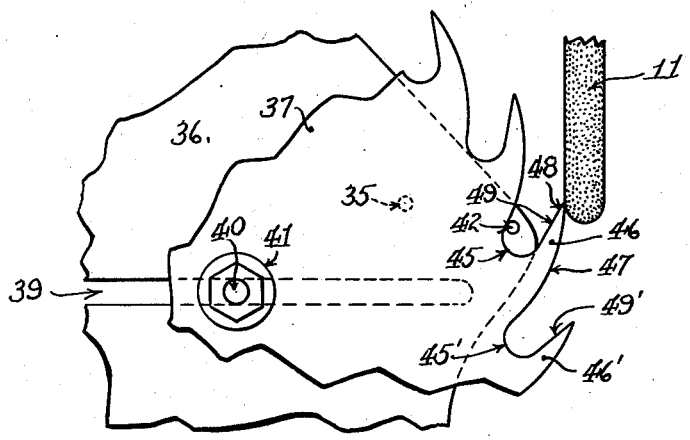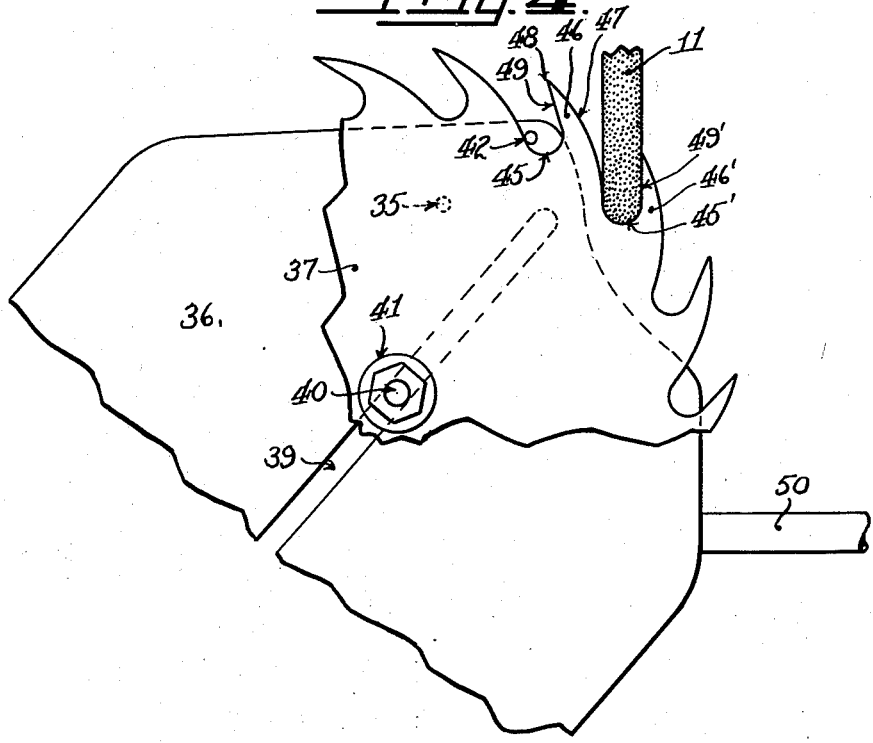

Patented May 18, 1943

2,319,437

UNITED STATES PATENT OFFICE 2,319,437

SAW GRINDING MACHINE

John B. Biasotti, Albany, Calif.

Application November 25, 1940, Serial No. 367,066

4 Claims. (Cl. 76—42)

The present invention relates to jigs for gumming and sharpening circular saws, dado cutters and the like.

The principal objects of the invention are to provide a simple jig for holding and moving a saw in grinding relation to an abrasive wheel, in which the setting adjustments can be quickly and easily made, which will cause each tooth to be properly shaped and ground, and which produces perfect uniformity of all the teeth of the saw and maintains the teeth in a true circle. Other objects are to provide solid support for the saw while being ground, to provide adjustments to permit proper grinding of saws and dado cutters of various diameter and thickness and those having teeth of various form, and to provide means for grinding teeth with a bevel or fleam when desired. Still further objects and advantages of the invention will become apparent from the following specification, which should be read with the understanding that changes, within the scope of the claims hereto appended, may be made in the form, construction and arrangement of the several parts herein shown and described, without departing from the spirit of the invention.

A preferred embodiment of the invention is illustrated in the accompanying drawings, wherein Fig. 1 is a plan view of the complete machine.

Figs. 3 and 4 are fragmentary plan views showing the relative positions of the saw and the grinding wheel at the beginning and end respectively of the operation of grinding one tooth.

Figure 1:
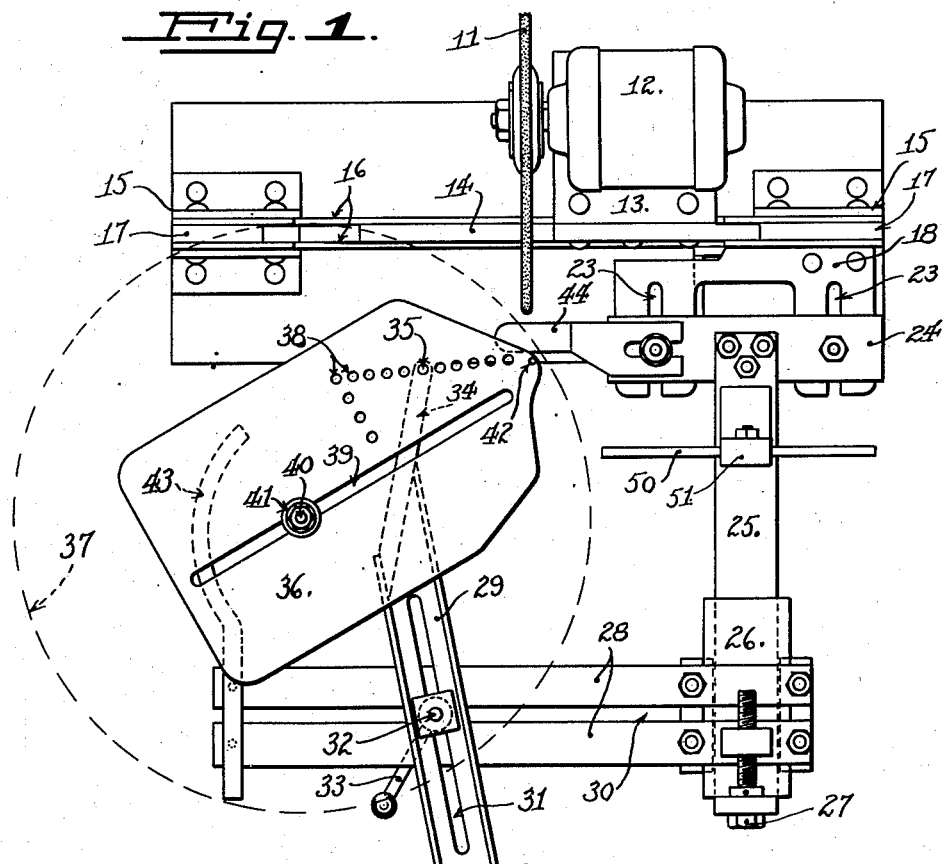
Figure 2:
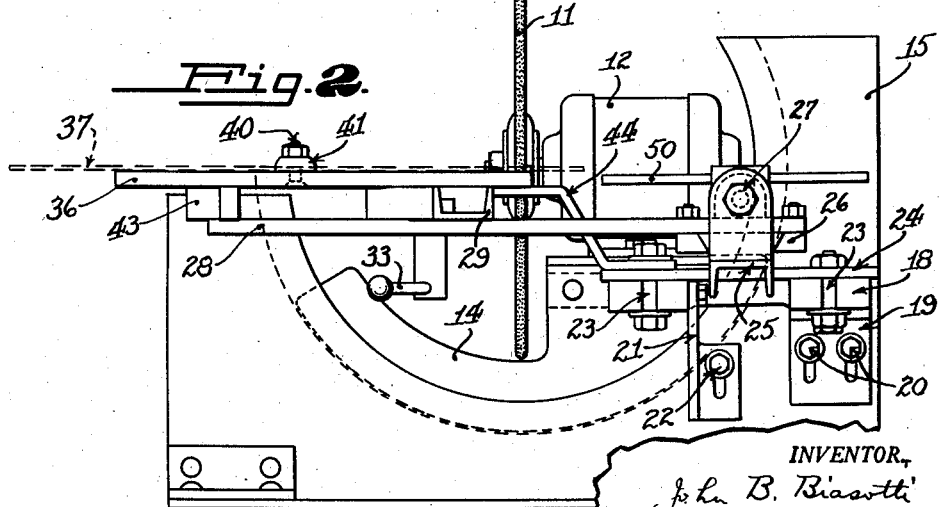
Fig. 2 is a front elevation.

Referring in more detail to the drawings, the reference numeral 11 designates a grinding wheel driven by an electric motor 12. The motor 12 is mounted on a bracket 13 which has a segmental flange 14 positioned in a vertical plane. The flange 14 is mounted for rotary adjusting movement in a guide frame 15 formed by two arcuate vertical plates 16 spaced apart by a spacer 17. The center of the arcuate guide 15 coincides with the center of the grinding wheel 11 so that by turning the motor bracket 13 in said guide the vertical angle of the grinding wheel can be changed for the purpose of producing a bevel or fleam on the teeth of the saw, as will appear hereinafter. The motor bracket 13 is locked in adjusted position in the arcuate guide 15 by any suitable means not shown herein.

A bracket 18 has a vertical portion 19 secured to the guide frame 15 by a slot and bolt connection 20 which permits vertical adjustment. The left hand side of said bracket 18 is braced by a member 21 which is secured to the frame 15 by an adjustable slot and bolt connection 22. The horizontal portions of the bracket 18 are provided with slots 23 to which a cross piece 24 is bolted, and a forwardly extending arm 25 is secured to and extends forwardly from said cross piece, the slots 23 providing forward and rearward adjustment for said arm 25. The outer end of the arm 25 carries a sliding carriage 26 which can be moved forwardly and rearwardly by an adjusting screw 27.

A second horizontal arm 28 is secured to the carriage 26 and extends at right angles to the arm 25. A third horizontal arm 29 is adjustably secured to the arm 28 and extends rearwardly therefrom, i. e., toward the grinding wheel 11. The arms 28 and 29 are provided with slots 30 and 31 respectively and are held together in adjustable relation by a bolt 32 having a wing or lever nut 33.

The rear end of the arm 29 has an extension 34 provided with a vertical pin 35. Upon said pin is rotatably mounted a horizontal table 36 upon which a saw is placed, as indicated in broken lines at 37.

The table 36 is provided with a plurality of holes or sockets 38, any one of which may fit over the pin 35 to provide a rotatable mounting for the table for a purpose to be explained later. The pin 35 and the sockets 38 form a plurality of mutually exclusive separable pivotal connections between the extension support 34 and the table 36. A slot 39 is formed in the table 36 and through said slot extends a bolt 40 upon which is a bushing 41 of proper diameter to fit the hole in the center of the saw 37. The bolt 40 is adjustable lengthwise in the slot 39 to accommodate saws of different diameters, and the bushing 41 can be removed and replaced with one of proper diameter to fit the center hole in the particular saw being ground.

At the end of the table nearest the grinding wheel 11, a small pin 42 rises slightly above the upper surface of said plate to form a stop or locating pin engaging the tooth whose back is to be ground. A supporting arm 43 is secured to the outer end of the arm 28 and extends rearwardly beneath the table 36 to support its outer or rear end. A second supporting bracket 44 is adjustably secured to one of the bolts of the angle bracket 18, and its end is positioned beneath the inner end of the table 36 adjacent the grinding wheel 11.

In setting the adjustment of the machine, with the grinding wheel stationary, the saw 37 is placed on the table 36 with the gullet 45 of one tooth 46 against the stop 42, as shown in Fig. 3. A center bushing 41 of proper size is then placed upon the bolt 40 and said bolt is locked in such position in the slot 39 as to enable the hole in the center of the saw to fit over said bushing while the tooth is in contact with the stop 42. The center bushing 41 remains in this position throughout the grinding of all teeth of that particular saw.

The vertical adjustment of the bracket 18 is set to position the saw in the horizontal plane of the center of the grinding wheel, and the rotative position of the motor bracket 13 in its arcuate guide 15 is set to produce the desired angle or bevel for the edges of the teeth. The mounting pin 35 is inserted in the proper hole 38 of the table so as to produce the desired curvature of the back 47 of the tooth when the table is swung about said pin 35 as a center. That is to say, the distance from the center pin 35 to the point 48 of the tooth is equal to the radius of curvataure of the back 47 of said tooth, as will be clearly seen from Fig. 3.

The edge portion of the grinding wheel 11 is shaped to form the front 49 of the tooth and the gullet 45 of the preceding tooth. In the initial setting, the arm 29 and the table 36 are placed to bring the edge of the grinding wheel 11 into the gullet 45' of the tooth 46 immediately behind the stop 42, as shown in Fig. 4. In this position of the table, a stop 50 (Fig. 1), adjustably secured in a clamp 51 mounted upon the arm 25, is set so that its left hand end is in contact with the edge of the table 36, thereby limiting the rotative movement of said table and limiting the grinding of the bottom of the gullet 45'. The table is then swung clockwise about the pin 35 as a center, and if the proper hole 38 has been chosen, the back 47 of the tooth 46 will follow the edge of the grinding wheel to the position shown in Fig. 3. The setting is now complete and grinding can be started.

The table 36 is first swung clockwise to carry the tooth clear of the wheel. The wheel is started and the feed screw 27 is set up sufficiently to produce the desired depth of grind, thereby moving the table that much closer to the grinding wheel. The table is then turned counterclockwise about the pin 35 until its edge contacts the end of the stop 50, thereby preventing further movement. This operation carries the tooth from the position shown in Fig. 3 to that of Fig. 4 and grinds first the back 47 of the tooth 46 and then the gullet 45' and the front 49' of the next succeeding tooth 46'. The table is then rotated clockwise again to carry the ground tooth free of the wheel 11, and the saw is shifted on the table about the center bushing 41 until the ground gullet 45' contacts the stop pin 42. This brings the next following tooth into position for grinding, and the operation is repeated as before.

It will be seen that because the arm 29 is stationary after having been set, and because the distance between the center bushing 41 and the tooth stop 42 remains constant, the front faces and the gullets of all teeth will be uniformly ground. Moreover, because the table is rotated about the pin 35 as a center during the grinding of each tooth, the curvature of the backs of all teeth will also be uniform. The saw when ground is therefore perfectly circular, and each tooth is identical with all the others. The shape and uniformity of the teeth is not dependent upon the operator's skill and accuracy of eye, but is positively determined by the shape of the wheel and the distance between its face and the pin 35 about which the table is swiveled, this distance being the radius of curvature of the backs of the teeth.

I claim:

1. A grinding machine for circular saws comprising a grinding wheel, a movable horizontal table for supporting the saw, said table having a slot and a plurality of spaced holes, a stud adjustably secured in said slot and projecting above the table to engage and locate the center of the saw, a pin projecting above the table to engage a tooth of the saw, a bracket, means adjustably positioning said bracket with relation to the grinding wheel, means for feeding said bracket toward and away from the wheel, a pin projecting upwardly from said bracket for selective engagement with any one of said holes, the table being thereby supported for free swiveling movement in a horizontal plane, and an adjustable stop positioned to engage said table to limit said swiveling movement.

2. A grinding machine for circular saws comprising a grinding wheel, a movable horizontal table for supporting the saw, said table having a slot and a plurality of spaced holes, a stud adjustably secured in said slot and projecting above the table to engage and locate the center of the saw, a pin projecting above the table to engage a tooth of the saw, a bracket, means adjustably positioning said bracket with relation to the grinding wheel, and a pin projecting upwardly from said bracket for selective engagement with any one of said holes, the table being thereby supported for free swiveling movement in a horizontal plane.

3. A grinding machine for circular saws comprising a grinding wheel, a journal mounting therefor having a vertical arcuate flange, a guide frame in which said flange is mounted for rotative adjustment centered about the center of the wheel, a bracket extending forwardly from said guide frame, said bracket being secured to said guide frame for vertical adjustment, an arm carried by said bracket and extending laterally therefrom, a second arm adjustably secured to the first arm and extending rearwardly toward the wheel, a pin projecting upwardly from the rear end of said second arm, a movable table for supporting the saw, means on said table for engaging and locating the center of the saw, means on said table for engaging one tooth of the saw, one of said engaging means being adjustable toward and away from the other engaging means, and said table having a plurality of sockets formed for selective engagement with said pin to form a free swivel mounting for said table.

4. A grinding machine for circular saws comprising a frame, a grinding wheel mounted thereon, a bracket extending forwardly from said frame, a second bracket movably mounted on the first bracket and extending transversely thereof, means for shifting the second bracket on the first bracket toward and away from the grinding wheel, a third bracket adjustably secured to the second bracket and extending rearwardly toward the grinding wheel, a saw supporting table pivotally mounted on the third bracket, said table having a slot, a stud adjustably secured in said slot and projecting above the table to engage and locate the center of the saw, a pin projecting above the table for engaging a tooth of the saw, and a plurality of mutually exclusive pivotal connections between the table and the third bracket, any one of which may be selected as the pivot about which the table is rotatable to carry the edge of the saw in an arcuate path toward and away from the grinding wheel, said pivotal connections providing different radii for said arcuate path.

JOHN B. BIASOTTI.